(12) United States Patent
Balan et al.

(10) Patent No.: US 8,933,931 B2
(45) Date of Patent: Jan. 13, 2015

(54) DISTRIBUTED ASYNCHRONOUS LOCALIZATION AND MAPPING FOR AUGMENTED REALITY

(71) Applicants: Alexandru Balan, Redmond, WA (US); Jason Flaks, Redmond, WA (US); Steve Hodges, Cambridge (GB); Michael Isard, San Francisco, CA (US); Oliver Williams, San Francisco, CA (US); Paul Barham, San Francisco, CA (US); Shahram Izadi, Cambridge (GB); Otmar Hiliges, Redmond, WA (US); David Molyneaux, Oldham (GB); David Kim, Cambridge (GB)

(72) Inventors: Alexandru Balan, Redmond, WA (US); Jason Flaks, Redmond, WA (US); Steve Hodges, Cambridge (GB); Michael Isard, San Francisco, CA (US); Oliver Williams, San Francisco, CA (US); Paul Barham, San Francisco, CA (US); Shahram Izadi, Cambridge (GB); Otmar Hiliges, Redmond, WA (US); David Molyneaux, Oldham (GB); David Kim, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 32 days.

(21) Appl. No.: 13/688,093

(22) Filed: Nov. 28, 2012

(65) Prior Publication Data

US 2013/0169626 A1 Jul. 4, 2013

Related U.S. Application Data

(63) Continuation of application No. 13/152,220, filed on Jun. 2, 2011, now abandoned.

(51) Int. Cl.
*G06T 15/00* (2011.01)
*G06K 9/64* (2006.01)
*H04N 7/00* (2011.01)
*G06T 19/00* (2011.01)

(52) U.S. Cl.
CPC .................................. *G06T 19/006* (2013.01)
USPC ........................... 345/419; 382/285; 348/113

(58) Field of Classification Search
None
See application file for complete search history.

(56) References Cited

U.S. PATENT DOCUMENTS

| 5,786,849 | A | * | 7/1998 | Lynde | ........................... 348/113 |
| 7,831,094 | B2 | | 11/2010 | Gupta | |
| 2008/0310757 | A1 | * | 12/2008 | Wolberg et al. | ............... 382/285 |
| 2010/0045701 | A1 | | 2/2010 | Scott | |
| 2010/0208033 | A1 | | 8/2010 | Edge | |
| 2010/0238161 | A1 | * | 9/2010 | Varga et al. | ................... 345/419 |

(Continued)

OTHER PUBLICATIONS

Office Action dated May 16, 2013, U.S. Appl. No. 13/152,220.

(Continued)

*Primary Examiner* — Kimbinh T Nguyen
*Assistant Examiner* — Raffi Isanians
(74) *Attorney, Agent, or Firm* — Micah Goldsmith; Judy Yee; Micky Minhas

(57) ABSTRACT

A system and method for providing an augmented reality environment in which the environmental mapping process is decoupled from the localization processes performed by one or more mobile devices is described. In some embodiments, an augmented reality system includes a mapping system with independent sensing devices for mapping a particular real-world environment and one or more mobile devices. Each of the one or more mobile devices utilizes a separate asynchronous computing pipeline for localizing the mobile device and rendering virtual objects from a point of view of the mobile device. This distributed approach provides an efficient way for supporting mapping and localization processes for a large number of mobile devices, which are typically constrained by form factor and battery life limitations.

19 Claims, 13 Drawing Sheets

(56) References Cited

U.S. PATENT DOCUMENTS

2010/0257252 A1 10/2010 Dougherty
2012/0306850 A1 12/2012 Balan

OTHER PUBLICATIONS

Martek, "Hierarchical Parallel Tracking and Mapping," Published Date: Dec. 2, 2010, http://www.craigmartek.com/wp-content/uploads/2010/12/proposal.pdf.

Reitmayr, et al., "Simultaneous Localization and Mapping for Augmented Reality," Published Date: 2010 http://ieeexplore.ieee.org/stamp/stamp.jsp?tp=&arnumber=5557942.

Castle, et al., "Object Recognition and Localization while Tracking and Mapping," Retrieved Date: Mar. 11, 2011 http://www.robots.ox.ac.uk:5000/~lav/Papers/castle_murray_ismar2009/castle_murray_ismar2009.pdf.

Banwell, et al., "Combining Absolute Positioning and Vision for Wide Area Augmented Reality," Retrieved Date: Mar. 11, 2011, http://www.cs.bris.ac.uk/Publications/Papers/2001229.pdf.

\* cited by examiner

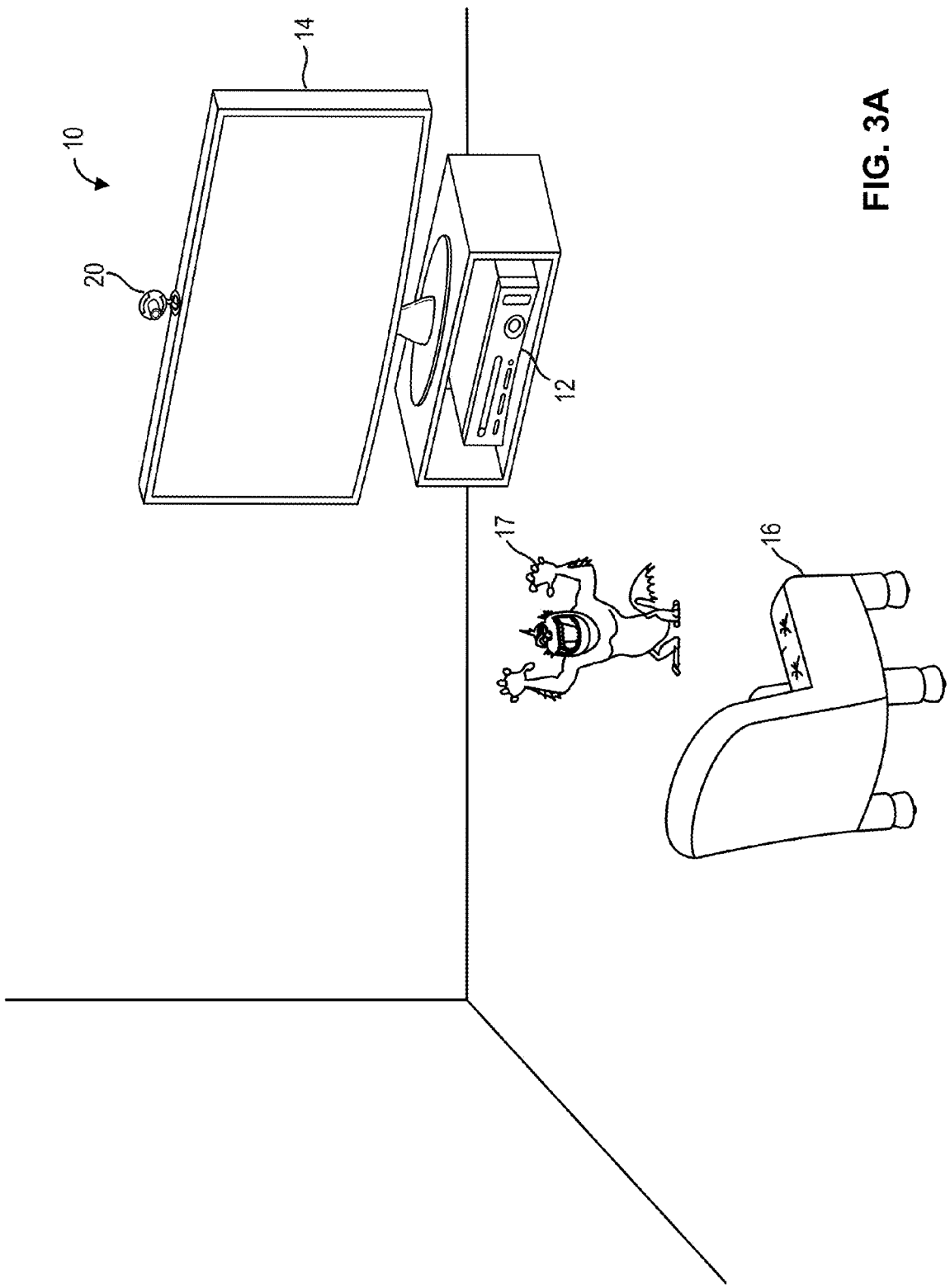

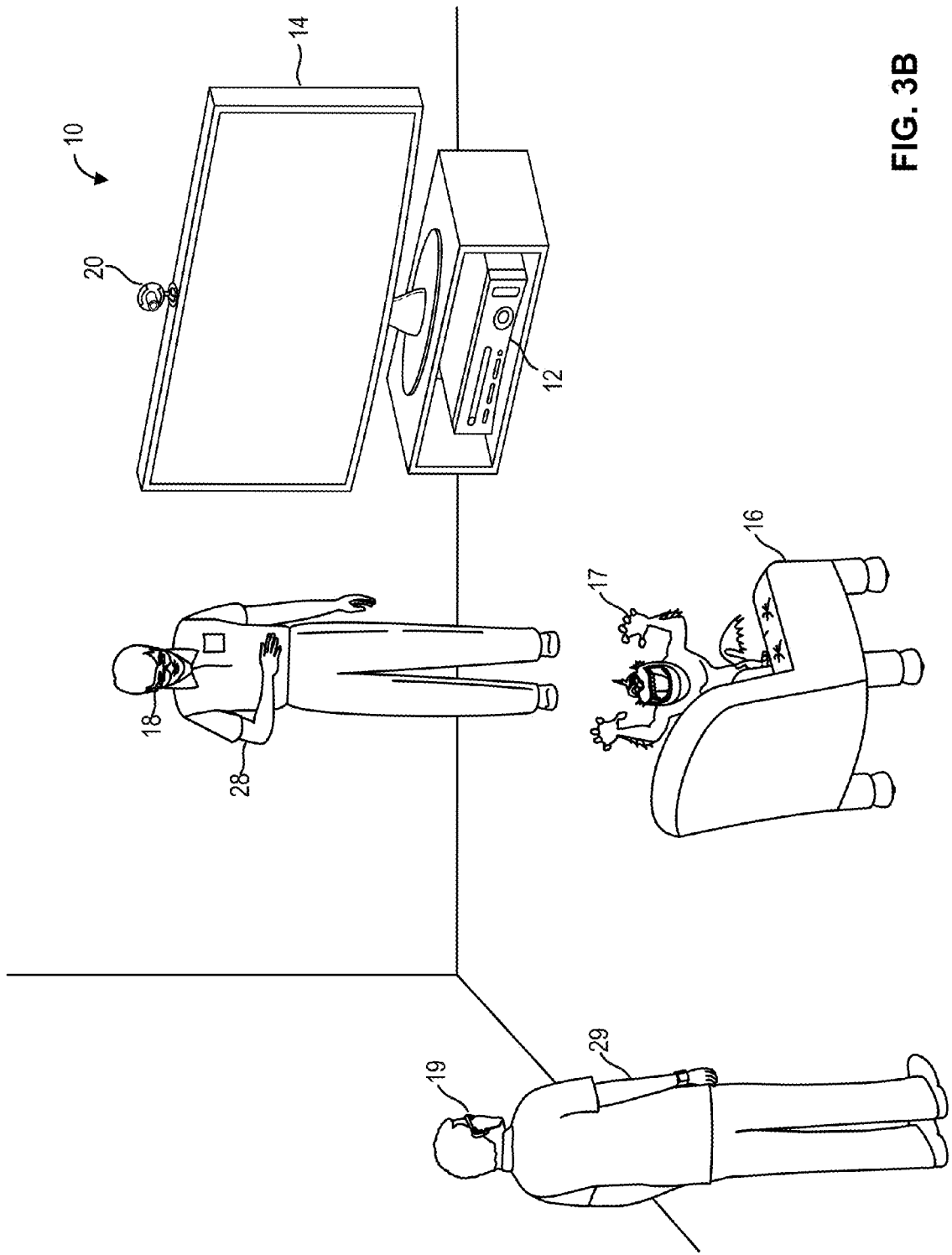

DISTRIBUTED ASYNCHRONOUS LOCALIZATION AND MAPPING FOR AUGMENTED REALITY

CLAIM OF PRIORITY

This application is a continuation application of co-pending U.S. patent application Ser. No. 13/152,220, entitled "Distributed Asynchronous Localization and Mapping for Augmented Reality," by Balan et al., filed Jun. 2, 2011, incorporated herein by reference in its entirety.

BACKGROUND

Augmented reality (AR) relates to providing an augmented real-world environment where the perception of a real-world environment (or data representing a real-world environment) is augmented or modified with computer-generated virtual data. For example, data representing a real-world environment may be captured in real-time using sensory input devices such as a camera or microphone and augmented with computer-generated virtual data including virtual images and virtual sounds. The virtual data may also include information related to the real-world environment such as a text description associated with a real-world object in the real-world environment. An AR environment may be used to enhance numerous applications including video game, mapping, navigation, and mobile device applications.

Some AR environments enable the perception of real-time interaction between real objects (i.e., objects existing in a particular real-world environment) and virtual objects (i.e., objects that do not exist in the particular real-world environment). In order to realistically integrate the virtual objects into an AR environment, an AR system typically performs several steps including mapping and localization. Mapping relates to the process of generating a map of the real-world environment. Localization relates to the process of locating a particular point of view or pose relative to the map. A fundamental requirement of many AR systems is the ability to localize the pose of a mobile device moving within a real-world environment in order to determine the particular view associated with the mobile device that needs to be augmented.

In robotics, traditional methods employing simultaneous localization and mapping (SLAM) techniques have been used by robots and autonomous vehicles in order to build a map of an unknown environment (or to update a map within a known environment) while simultaneously tracking their current location for navigation purposes. Most SLAM approaches are incremental, meaning that they iteratively update the map and then update the estimated camera pose in the same process. An extension of SLAM is parallel tracking and mapping (PTAM), which separates the mapping and localization steps into parallel computation threads. Both SLAM and PTAM techniques produce sparse point clouds as maps. Sparse point clouds may be sufficient for enabling camera localization, but may not be sufficient for enabling complex augmented reality applications such as those that must handle collisions and occlusions due to the interaction of real objects and virtual objects. Both SLAM and PTAM techniques utilize a common sensing source for both the mapping and localization steps.

SUMMARY

Technology is described for providing an augmented reality environment in which the environmental mapping process is decoupled from the localization processes performed by one or more mobile devices. In some embodiments, an augmented reality system includes a mapping system with independent sensing devices for mapping a particular real-world environment and one or more mobile devices. Each of the one or more mobile devices utilizes a separate asynchronous computing pipeline for localizing the mobile device and rendering virtual objects from a point of view of the mobile device. This distributed approach provides an efficient way for supporting mapping and localization processes for a large number of mobile devices, which are typically constrained by form factor and battery life limitations.

One embodiment includes determining whether a first map is required, acquiring the first map, storing the first map on a mobile device, determining a first pose associated with the mobile device, determining whether a second map is required including determining whether a virtual object is located within a field of view associated with the first pose, acquiring the second map, storing the second map on the mobile device, registering a virtual object in relation to the second map, rendering the virtual object, and displaying on the mobile device a virtual image associated with the virtual object corresponding with a view of the virtual object such that the virtual object is perceived to exist within the field of view associated with the first pose.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3A depicts one embodiment of a field of view as seen by a user wearing a HMD.

FIG. 3B depicts one embodiment of an AR environment.

DETAILED DESCRIPTION

Technology is described for providing an augmented reality environment in which the environmental mapping process is decoupled from the localization processes performed by one or more mobile devices. In some embodiments, an augmented reality system includes a mapping system with independent sensing devices for mapping a particular real-world environment and one or more mobile devices. Each of the one or more mobile devices utilizes a separate asynchronous computing pipeline for localizing the mobile device and rendering virtual objects from a point of view of the mobile device. This distributed approach provides an efficient way for supporting mapping and localization processes for a large number of mobile devices, which are typically constrained by form factor and battery life limitations.

An AR system may allow a user of a mobile device to view augmented images in real-time as the user moves about within a particular real-world environment. In order for the AR system to enable the perceived interaction between the particular real-world environment and virtual objects within the particular real-world environment, several problems must be solved. First, the AR system must generate a map of the particular real-world environment in which the virtual objects are to appear and interact (i.e., perform a mapping step). Second, the AR system must determine a particular pose associated with the mobile device (i.e., perform a localization step). Finally, the virtual objects that are to appear within the field of view of the particular pose must be registered or aligned with a coordinate system associated with the particular real-world environment. Solving these problems takes considerable processing power and providing the computer hardware necessary to accomplish real-time AR is especially difficult because of form factor and power limitations imposed on mobile devices.

In general, solving the mapping problem is computationally much more difficult than the localization problem and may require more computational power as well as more sophisticated sensors for increased robustness and accuracy. However, the mapping problem need not be solved in real-time if landmarks or other real objects within the real-world environment are static (i.e., do not move) or semi-static (i.e., do not move often). On the other hand, mobile device localization does need to be performed in real-time in order enable the perception of real-time interaction between real objects and virtual objects.

Figure 1:
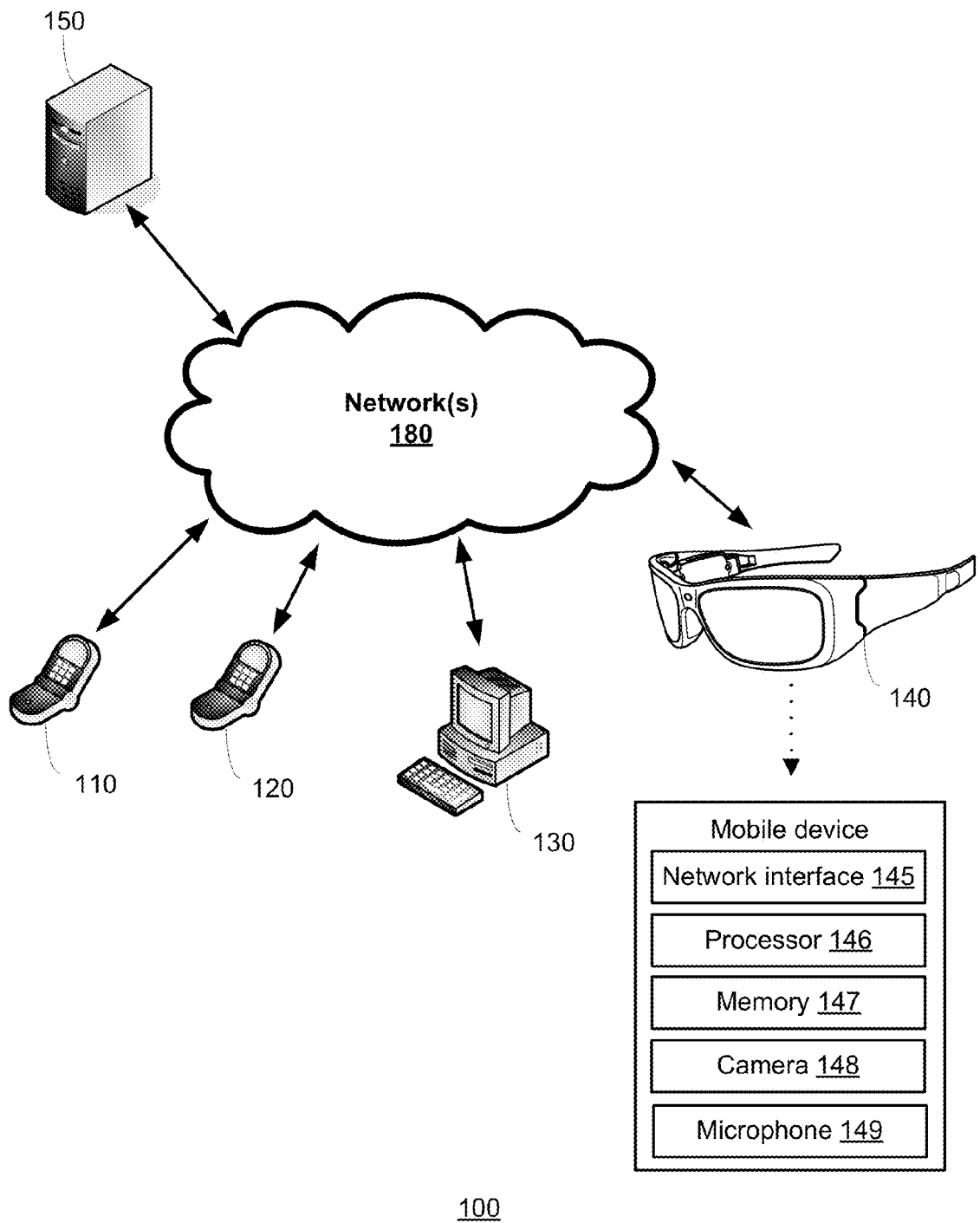
FIG. 1 is a block diagram of one embodiment of a networked computing environment in which the disclosed technology may be practiced.

FIG. 1 is a block diagram of one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 140, mobile devices 110 and 120, desktop computer 130, and mapping server 150. In some embodiments, the plurality of computing devices may include other computing devices not shown. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as mapping server 150, may allow a client to download information (e.g., text, audio, image, and video files) from the server or to perform a search query related to particular information stored on the server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of mobile device 140 includes a camera 148, microphone 149, network interface 145, processor 146, and memory 147, all in communication with each other. Camera 148 may capture digital images and/or videos. Microphone 149 may capture sounds. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein.

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer network diagrams to depict the Internet as an abstraction of the underlying infrastructure it represents.

In one example of an AR environment, one or more users may move around a real-world environment (e.g., a living room) each wearing special glasses, such as mobile device 140, that allow the one or more users to observe views of the real-world overlaid with virtual images of virtual objects that maintain coherent spatial relationship with the real-world environment (i.e., as a particular user turns their head or moves within the real-world environment, the virtual images displayed to the particular user will change such that the virtual objects appear to exist within the real-world environment as perceived by the particular user). In one embodiment, environmental mapping of the real-world environment is performed by mapping server 150 (i.e., on the server side) while camera localization is performed on mobile device 140 (i.e., on the client side). The one or more users may also perceive 3-D localized virtual surround sounds that match the general acoustics of the real-world environment and that seem fixed in space with respect to the real-world environment.

In another example, live video images captured using a video camera on a mobile device, such as mobile device 120, may be augmented with computer-generated images of a virtual monster. The resulting augmented video images may then be displayed on a display of the mobile device in real-time such that an end user of the mobile device sees the virtual monster interacting with the real-world environment captured by the mobile device. In another example, the perception of a real-world environment may be augmented via a head-mounted display device (HMD), which may comprise a video see-through and/or an optical see-through system. Mobile device 140 is one example of an optical see-through HMD. An optical see-through HMD worn by an end user may allow actual direct viewing of a real-world environment (e.g., via transparent lenses) and may, at the same time, project images of a virtual object into the visual field of the end user thereby augmenting the real-world environment perceived by the end user with the virtual object.

Figure 2:
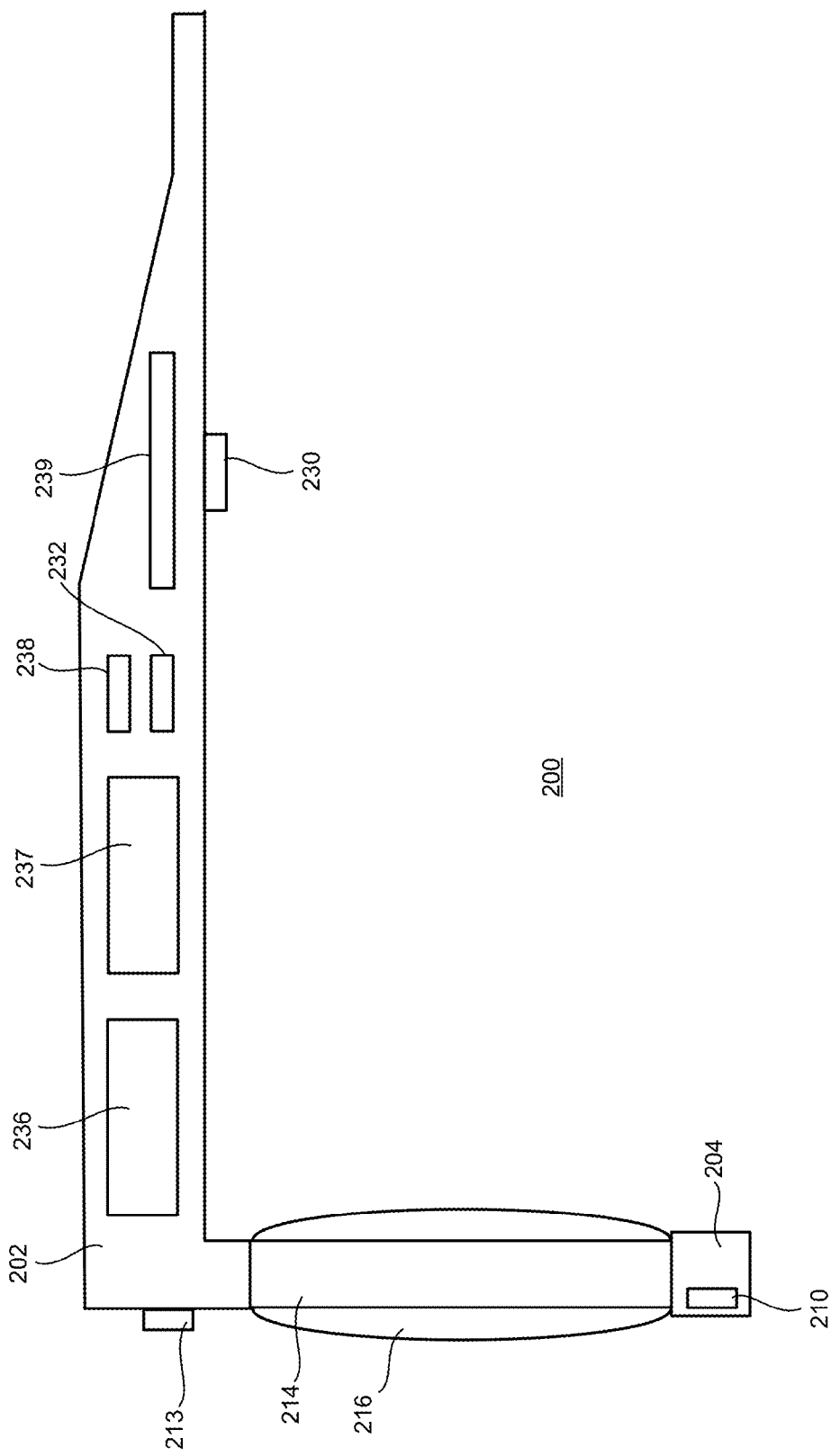
FIG. 2 depicts one embodiment of a portion of an HMD.

FIG. 2 depicts one embodiment of a portion of an HMD, such as mobile device 140 in FIG. 1. Only the right side of a head-mounted device is depicted. HMD 200 includes right temple 202, nose bridge 204, eye glass 216, and eye glass frame 214. Built into nose bridge 204 is a microphone 210 for recording sounds and transmitting the audio recording to processing unit 236. A front facing camera 213 is embedded inside right temple 202 for recording digital images and/or videos and transmitting the visual recordings to processing unit 236. Front facing camera 213 may capture color information, IR information, and/or depth information. Microphone 210 and front facing camera 213 are in communication with processing unit 236.

Also embedded inside right temple 202 are ear phones 230, motion and orientation sensor 238, GPS receiver 232, power supply 239, and wireless interface 237, all in communication with processing unit 236. Motion and orientation sensor 238 may include a three axis magnetometer, a three axis gyro, and/or a three axis accelerometer. In one embodiment, the motion and orientation sensor 238 may comprise an inertial measurement unit (IMU). The GPS receiver may determine a GPS location associated with HMD 200. Processing unit 236 may include one or more processors and a memory for storing computer readable instructions to be executed on the one or more processors. The memory may also store other types of data to be executed on the one or more processors.

In one embodiment, eye glass 216 may comprise a see-through display, whereby virtual images generated by processing unit 236 may be projected and/or displayed on the see-through display. The front facing camera 213 may be calibrated such that the field of view captured by the front facing camera 213 corresponds with the field of view as seen by a user of HMD 200. The ear phones 230 may be used to output virtual sounds associated with the virtual images. In some embodiments, HMD 200 may include two or more front facing cameras (e.g., one on each temple) in order to obtain depth from stereo information associated with the field of view captured by the front facing cameras. The two or more front facing cameras may also comprise 3-D, IR, and/or RGB cameras. Depth information may also be acquired from a single camera utilizing depth from motion techniques. For example, two images may be acquired from the single camera associated with two different points in space at different points in time. Parallax calculations may then be performed given position information regarding the two different points in space.

FIG. 3A depicts one embodiment of a field of view as seen by a user wearing a HMD such as mobile device 140 in FIG. 1. The user may see within the field of view both real objects and virtual objects. The real objects may include a chair 16 and a mapping system 10 (e.g., comprising a portion of an entertainment system). The virtual objects may include a virtual monster 17. As the virtual monster 17 is displayed or overlaid over the real-world environment as perceived through the see-through lenses of the HMD, the user may perceive that the virtual monster 17 exists within the real-world environment.

FIG. 3B depicts one embodiment of an AR environment. The AR environment includes a mapping system 10 and mobile devices 18 and 19. The mobile devices 18 and 19, depicted as special glasses in FIG. 3B, may include a HMD such as HMD 200 in FIG. 2. The mapping system 10 may include a computing environment 12, a capture device 20, and a display 14, all in communication with each other. Computing environment 12 may include one or more processors. Capture device 20 may include a color or depth sensing camera that may be used to visually monitor one or more targets including humans and one or more other objects within a particular environment. In one example, capture device 20 may comprise an RGB or depth camera and computing environment 12 may comprise a set-top box or gaming console. Mapping system 10 may support multiple mobile devices or clients.

The mobile devices 18 and 19 may include HMDs. As shown in FIG. 3B, user 28 wears mobile device 18 and user 29 wears mobile device 19. The mobile devices 18 and 19 may receive virtual data from mapping system 10 such that a virtual object is perceived to exist within a field of view as displayed through the respective mobile device. For example, as seen by user 28 through mobile device 18, the virtual object is displayed as the back of virtual monster 17. As seen by user 29 through mobile device 19, the virtual object is displayed as the front of virtual monster 17 appearing above the back of chair 16. The rendering of virtual monster 17 may be performed by mapping system 10 or by mobile devices 18 and 19. In one embodiment, mapping system 10 renders images of virtual monster 17 associated with a field of view of a particular mobile device and transmits the rendered images to the particular mobile device.

Figure 3C:
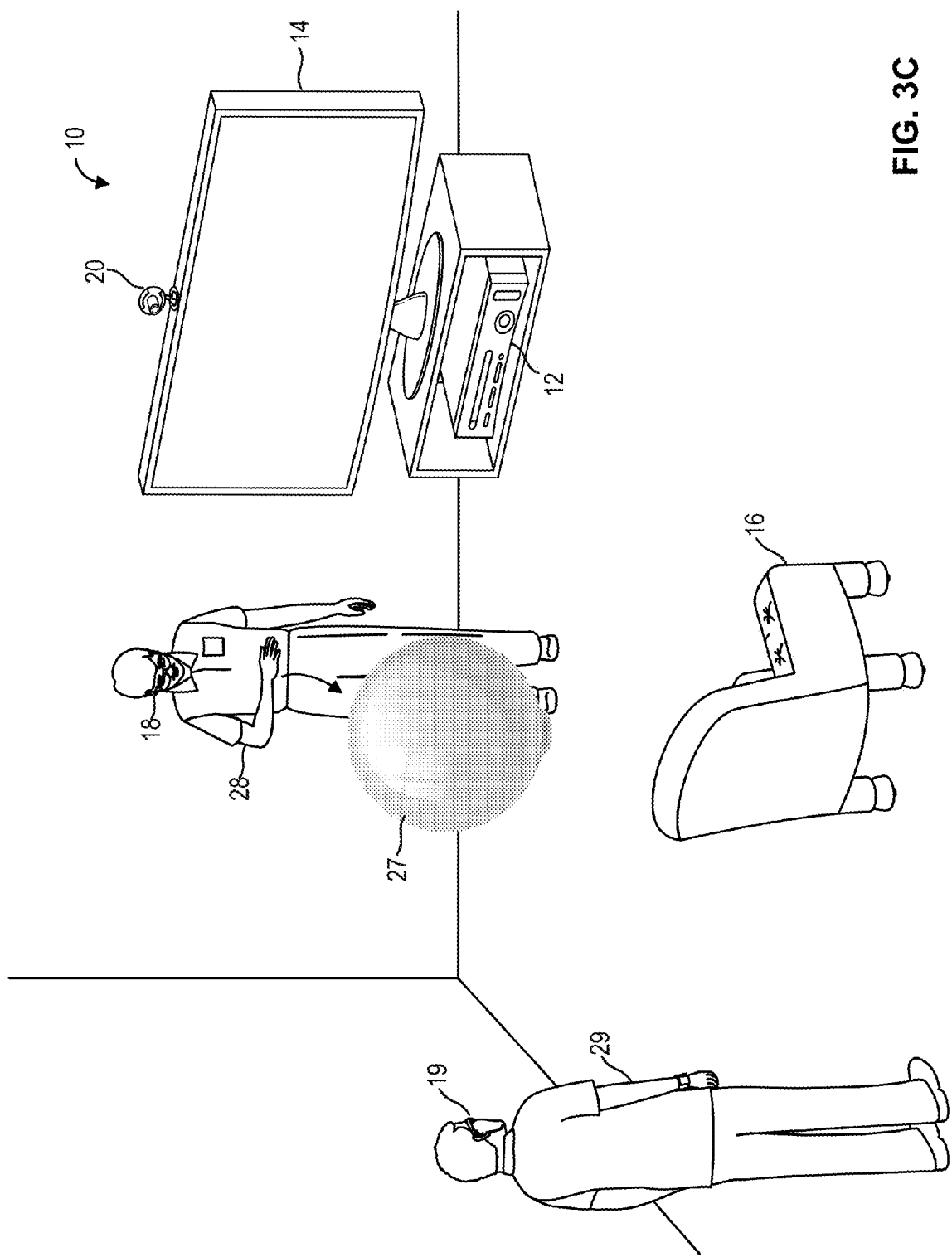
FIG. 3C depicts one embodiment of an AR environment.

FIG. 3C depicts one embodiment of an AR environment utilizing the mapping system 10 and mobile devices 18 and 19 depicted in FIG. 3B. The mapping system 10 may track and analyze virtual objects within a particular environment such as virtual ball 27. The mapping system 10 may also track and analyze real objects within the particular environment such as user 28, user 29, and chair 16. The rendering of images associated with virtual ball 27 may be performed by mapping system 10 or by mobile devices 18 and 19.

In one embodiment, mapping system 10 tracks the position of virtual objects by taking into consideration the interaction between real and virtual objects. For example, user 18 may move their arm such that user 18 perceives hitting virtual ball 27. The mapping system 10 may subsequently apply a virtual force to virtual ball 27 such that both users 28 and 29 perceive that the virtual ball has been hit by user 28. In one example, mapping system 10 may register the placement of virtual ball 27 within a 3-D map of the particular environment and provide virtual data information to mobile devices 18 and 19 such that users 28 and 29 perceive the virtual ball 27 as existing within the particular environment from their respective points of view. In another embodiment, a particular mobile device may render virtual objects that are specific to the particular mobile device. For example, if the virtual ball 27 is only rendered on mobile device 18 then the virtual ball 27 would only be perceived as existing within the particular environment by user 28. In some embodiments, the dynamics of virtual objects may be performed on the particular mobile device and not on the mapping system.

Figure 4:
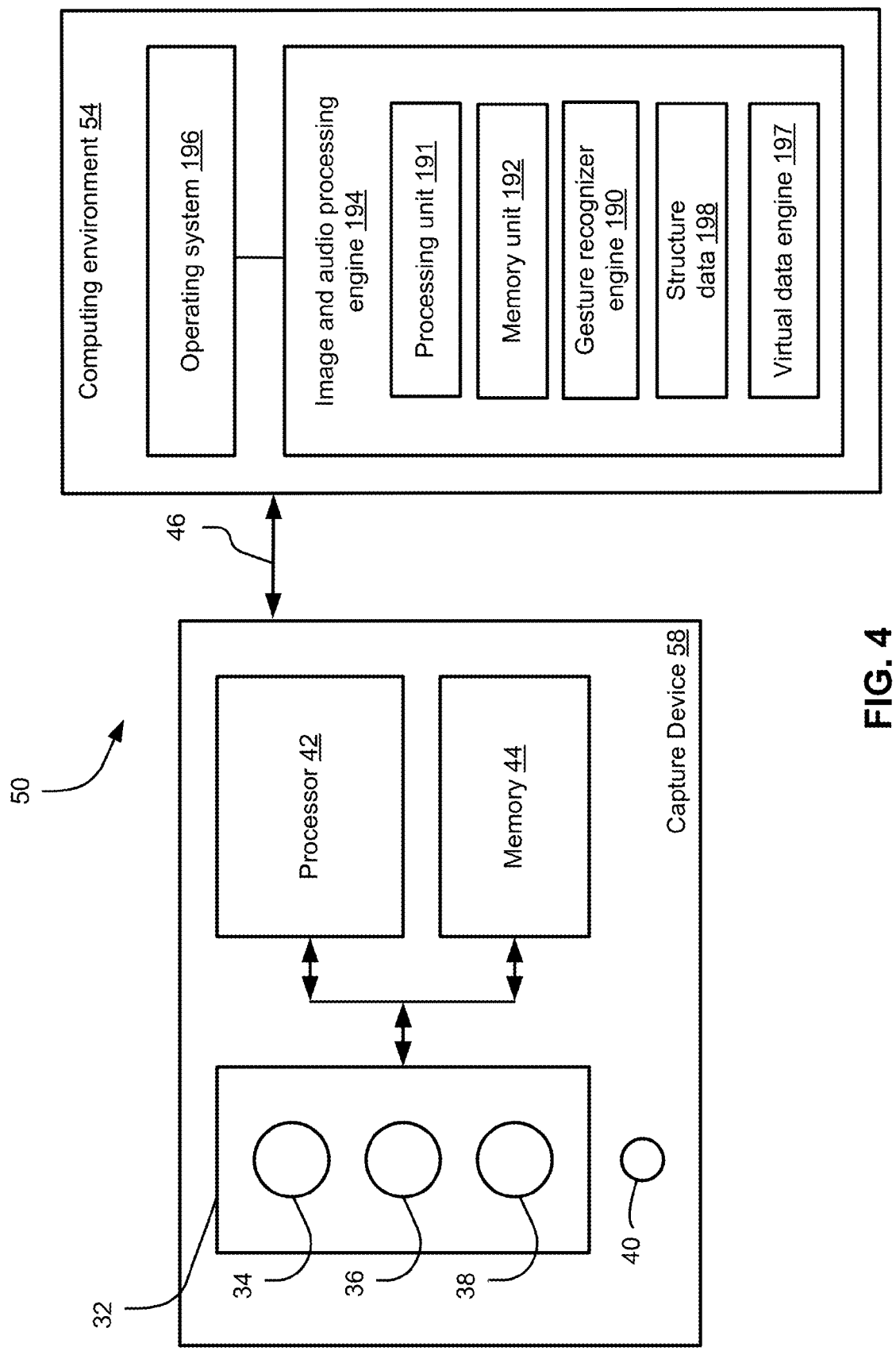
FIG. 4 illustrates one embodiment of a mapping system.

FIG. 4 illustrates one embodiment of a mapping system 50 including a capture device 58 and computing environment 54. Mapping system 50 is one example of an implementation for mapping system 10 in FIGS. 3B-3C. For example, computing environment 54 may correspond with computing environment 12 in FIGS. 3B-3C and capture device 58 may correspond with capture device 20 in FIGS. 3B-3C.

In one embodiment, the capture device 58 may include one or more image sensors for capturing images and videos. An image sensor may comprise a CCD image sensor or a CMOS sensor. In some embodiments, capture device 58 may include an IR CMOS image sensor. The capture device 58 may also include a depth camera (or depth sensing camera) configured to capture video with depth information including a depth image that may include depth values via any suitable technique including, for example, time-of-flight, structured light, stereo image, or the like.

The capture device 58 may include an image camera component 32. In one embodiment, the image camera component 32 may include a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

The image camera component 32 may include an IR light component 34, a three-dimensional (3-D) camera 36, and an RGB camera 38 that may be used to capture the depth image of a capture area. For example, in time-of-flight analysis, the IR light component 34 of the capture device 58 may emit an infrared light onto the capture area and may then use sensors to detect the backscattered light from the surface of one or more objects in the capture area using, for example, the 3-D camera 36 and/or the RGB camera 38. In some embodiments, pulsed infrared light may be used such that the time between an outgoing light pulse and a corresponding incoming light pulse may be measured and used to determine a physical distance from the capture device 58 to a particular location on the one or more objects in the capture area. Additionally, the phase of the outgoing light wave may be compared to the phase of the incoming light wave to determine a phase shift. The phase shift may then be used to determine a physical distance from the capture device to a particular location associated with the one or more objects.

In another example, the capture device 58 may use structured light to capture depth information. In such an analysis, patterned light (i.e., light displayed as a known pattern such as grid pattern or a stripe pattern) may be projected onto the capture area via, for example, the IR light component 34. Upon striking the surface of one or more objects (or targets) in the capture area, the pattern may become deformed in response. Such a deformation of the pattern may be captured by, for example, the 3-D camera 36 and/or the RGB camera 38 and analyzed to determine a physical distance from the capture device to a particular location on the one or more objects.

In some embodiments, two or more different cameras may be incorporated into an integrated capture device. For example, a depth camera and a video camera (e.g., an RGB video camera) may be incorporated into a common capture device. In some embodiments, two or more separate capture devices of the same or differing types may be cooperatively used. For example, a depth camera and a separate video camera may be used, two video cameras may be used, two depth cameras may be used, two RGB cameras may be used or any combination and number of cameras may be used. In one embodiment, the capture device 58 may include two or more physically separated cameras that may view a capture area from different angles to obtain visual stereo data that may be resolved to generate depth information. Depth may also be determined by capturing images using a plurality of detectors that may be monochromatic, infrared, RGB, or any other type of detector and performing a parallax calculation. Other types of depth image sensors can also be used to create a depth image.

As shown in FIG. 4, capture device 58 may include a microphone 40. The microphone 40 may include a transducer or sensor that may receive and convert sound into an electrical signal.

The capture device 58 may include a processor 42 that may be in operative communication with the image camera component 32. The processor 42 may include a standardized processor, a specialized processor, a microprocessor, or the like. The processor 42 may execute instructions that may include instructions for storing filters or profiles, receiving and analyzing images, determining whether a particular situation has occurred, or any other suitable instructions. It is to be understood that at least some image analysis and/or target analysis and tracking operations may be executed by processors contained within one or more capture devices such as capture device 58.

The capture device 58 may include a memory 44 that may store the instructions that may be executed by the processor 42, images or frames of images captured by the 3-D camera or RGB camera, filters or profiles, or any other suitable information, images, or the like. In one example, the memory 44 may include random access memory (RAM), read only memory (ROM), cache, Flash memory, a hard disk, or any other suitable storage component. As shown in FIG. 4, the memory 44 may be a separate component in communication with the image capture component 32 and the processor 42. In another embodiment, the memory 44 may be integrated into the processor 42 and/or the image capture component 32. In other embodiments, some or all of the components 32, 34, 36, 38, 40, 42 and 44 of the capture device 58 illustrated in FIG. 4 are housed in a single housing.

The capture device 58 may be in communication with the computing environment 54 via a communication link 46. The communication link 46 may be a wired connection including, for example, a USB connection, a FireWire connection, an Ethernet cable connection, or the like and/or a wireless connection such as a wireless 802.11b, g, a, or n connection. The computing environment 54 may provide a clock to the capture device 58 that may be used to determine when to capture, for example, a scene via the communication link 46. In one embodiment, the capture device 58 may provide the images captured by, for example, the 3D camera 36 and/or the RGB camera 38 to the computing environment 54 via the communication link 46.

As shown in FIG. 4, computing environment 54 includes image and audio processing engine 194 in communication with operating system 196. Image and audio processing engine 194 includes virtual data engine 197, gesture recognizer engine 190, structure data 198, processing unit 191, and memory unit 192, all in communication with each other. Image and audio processing engine 194 processes video, image, and audio data received from capture device 58. To assist in the detection and/or tracking of objects, image and audio processing engine 194 may utilize structure data 198 and gesture recognition engine 190. Virtual data engine 197 processes virtual objects and registers the position and orientation of virtual objects in relation to various maps of a real-world environment stored in memory unit 192.

Processing unit 191 may include one or more processors for executing object, facial, and voice recognition algorithms. In one embodiment, image and audio processing engine 194 may apply object recognition and facial recognition techniques to image or video data. For example, object recognition may be used to detect particular objects (e.g., soccer balls, cars, or landmarks) and facial recognition may be used to detect the face of a particular person. Image and audio processing engine 194 may apply audio and voice recognition techniques to audio data. For example, audio recognition may be used to detect a particular sound. The particular faces, voices, sounds, and objects to be detected may be stored in one or more memories contained in memory unit 192.

In some embodiments, one or more objects being tracked may be augmented with one or more markers such as an IR retroreflective marker to improve object detection and/or tracking. Planar reference images, coded AR markers, QR codes, and/or bar codes may also be used to improve object detection and/or tracking. Upon detection of one or more objects, image and audio processing engine 194 may report to operating system 196 an identification of each object detected and a corresponding position and/or orientation.

The image and audio processing engine 194 may utilize structural data 198 while performing object recognition. Structure data 198 may include structural information about targets and/or objects to be tracked. For example, a skeletal model of a human may be stored to help recognize body parts. In another example, structure data 198 may include structural information regarding one or more inanimate objects in order to help recognize the one or more inanimate objects.

The image and audio processing engine 194 may also utilize gesture recognizer engine 190 while performing object recognition. In one example, gestures recognizer engine 190 may include a collection of gesture filters, each comprising information concerning a gesture that may be performed by a skeletal model. The gesture recognition engine 190 may compare the data captured by capture device 58 in the form of the skeletal model and movements associated with it to the gesture filters in a gesture library to identify when a user (as represented by the skeletal model) has performed one or more gestures. In one example, image and audio processing engine 194 may use the gesture recognition engine 190 to help interpret movements of a skeletal model and to detect the performance of a particular gesture.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about gesture recognizer engine 190 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Figure 5:
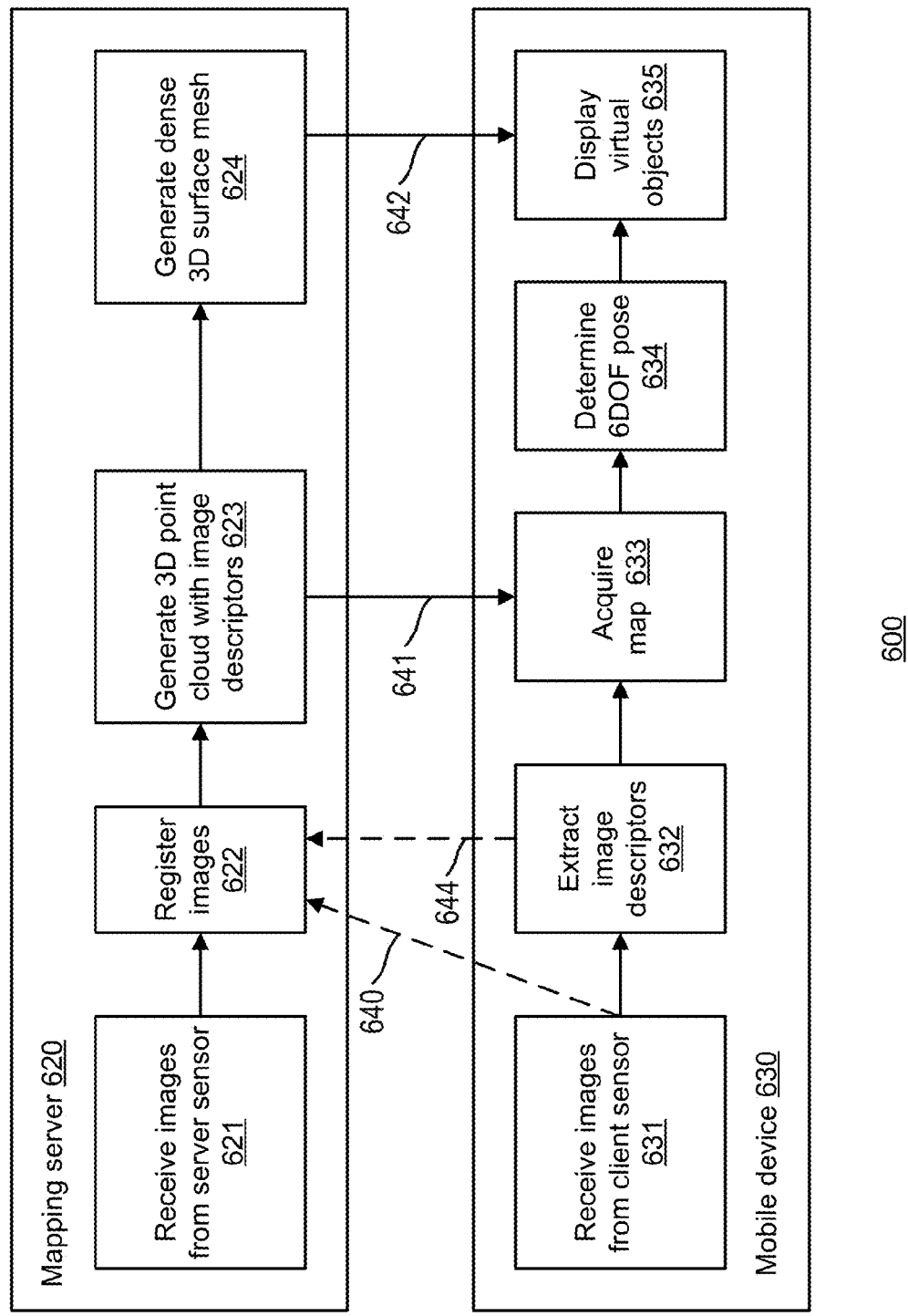
FIG. 5 depicts one embodiment of an AR system.

FIG. 5 depicts one embodiment of an AR system 600. AR system 600 includes mapping server 620 and mobile device 630. Mapping server 620 may comprise a mapping system such as mapping system 50 in FIG. 4. Mapping server 620 may work asynchronously to build one or more maps associated with one or more real-world environments. The one or more maps may include sparse 3-D maps and/or dense 3-D maps based on images captured from a variety of sources including sensors dedicated to mapping server 620. Mobile device 630 may comprise an HMD such as mobile device 140 in FIG. 1. Although a single mobile device 630 is depicted, mapping server 620 may support numerous mobile devices.

The process steps 621-624 associated with mapping server 620 are decoupled from and are performed independently of the process steps 631-635 associated with the mobile device 630. In step 621, images are received from one or more server sensors. One example of the one or more server sensors includes the 3-D and/or RGB cameras within the image camera component 32 in FIG. 4. The one or more server sensors may be associated with one or more stationary cameras and/or one or more mobile cameras which may move about a particular environment over time. The one or more mobile cameras may move in a predetermined or predictable manner about the particular environment (e.g., a dedicated mapping server camera that runs on tracks above a room or hangs from the ceiling of a room and rotates in a deterministic manner). In one embodiment, the one or more server sensors providing images to the mapping server 620 may move about an environment attached to a mobile robot or autonomous vehicle.

In step 622, images received from the one or more server sensors are registered. During image registration, the mapping server 620 may register different images taken within a particular environment (e.g., images from different points of view, taken at different points in time, and/or images associated with different types of information such as color or depth information) into a single real-world coordinate system associated with the particular environment. In one example, image registration into a common coordinate system may be performed using an extrinsic calibration process. The registration and/or alignment of images (or objects within the images) onto a common coordinate system allows the mapping server 620 to be able to compare and integrate real-world objects, landmarks, or other features extracted from the different images into one or more maps associated with the particular environment. The one or more maps associated with a particular environment may comprise 3-D maps.

More information about generating 3-D maps can be found in U.S. patent application Ser. No. 13/017,690, "Three-Dimensional Environment Reconstruction," incorporated herein by reference in its entirety.

In one embodiment, one or more additional images derived from sources decoupled from mapping server 620 may be used to extend or update the one or more maps associated with the particular environment. For example, client images 640 derived from sensors associated with mobile device 630 may be used by mapping server 620 to refine the one or more maps.

In some embodiments, the registration of one or more images may require knowledge of one or more poses associated with the one or more images. For example, for each image being registered, a six degree of freedom (6DOF) pose may be provided including information associated with the position and orientation of the particular sensor from which the image was captured. Mapping and pose estimation (or localization) associated with a particular sensor may be determined using traditional SLAM or PTAM techniques.

In step 623, a sparse map representing a portion of a particular environment is generated. The sparse map may comprise a 3-D point cloud and may include one or more image descriptors. The mapping server 620 may identify one or more image descriptors associated with a particular map of the one or more maps by applying various image processing methods such as object recognition, feature detection, corner detection, blob detection, and edge detection methods. The one or more image descriptors may be used as landmarks in determining a particular pose, position, and/or orientation in relation to the particular map. An image descriptor may include color and/or depth information associated with a particular object (e.g., a red apple) or a portion of a particular object within the particular environment (e.g., the top of a red apple). In some embodiments, an initial sparse map is generated first and then subsequently refined and updated over time. The initial sparse map may be limited to only covering static objects within the particular environment.

In step 624, a dense map representing a portion of the particular environment is generated. The dense map may comprise a dense 3-D surface mesh, which may be created using the 3-D point cloud generated in step 623. The dense map may provide sufficient detail of the particular environment so as to enable complex augmented reality applications such as those that must handle collisions and occlusions due to the interaction of real objects and virtual objects within the particular environment. In one embodiment, a particular dense map is not generated by mapping server 620 until a request for the particular dense map is received from mobile device 630. In another embodiment, a mobile device 630 may request a particular dense map first without requesting a related sparse map. In some embodiments, the process steps 621-624 associated with mapping server 620 may be performed in the cloud.

As mobile device 630 moves around a particular environment it may request mapping data 641 and/or mapping data 642 associated with a particular environment. The decision to request either mapping data 641 or mapping data 642 depends on the requirements of a particular AR application running on mobile device 630. In step 631, one or more client images are received from one or more client sensors. One example of the one or more client sensors includes the 3-D and/or RGB cameras associated with HMD 200 in FIG. 2. In one embodiment, the one or more client sensors detect light from a patterned or structured light source associated with and projected by mapping server 620. This allows several mobile devices to each independently utilize the same structured light source for localization purposes.

In step 632, one or more client image descriptors are extracted from the one or more client images. The mobile device 630 may identify one or more client image descriptors within the one or more client images by applying various image processing methods such as object recognition, feature detection, corner detection, blob detection, and edge detection methods. In step 633, a particular map is acquired from mapping server 620. The particular map may be included within mapping data 641. The map may be a 3-D map and may include one or more image descriptors associated with one or more objects located within the particular environment described by the 3-D map. An updated map may be requested by mobile device 630 every time the mobile device enters a new portion of the particular environment or at a predefined frequency (e.g., every 10 minutes).

In order to augment a real-world environment as observed from the point of view of mobile device 630, the pose associated with a particular field of view of mobile device 630 in relation to the real-world environment must be determined. In step 634, a pose (e.g., a 6DOF pose) associated with a field of view of mobile device 630 is determined via localization and/or pose estimation. Pose estimation may include the matching and aligning of detected image descriptors. For example, matching may be performed between the one or more client image descriptors and the image descriptors received from mapping server 620 included within mapping data 641. In some embodiments, matching may take into consideration depth and color information associated with the one or more image descriptors. In other embodiments, the one or more client images comprise color images (e.g., RGB images) and matching is performed for only image descriptors including color information, thereby enabling image-based localization for mobile devices with only RGB sensor input. Alignment of matched image descriptors may be performed using image or frame alignment techniques, which may include determining point to point correspondences between the field of view of mobile device 630 and views derived from the particular map.

In some embodiments, mobile device 630 may include a GPS receiver, such as GPS receiver 232 in FIG. 2, and a motion and orientation sensor, such as motion and orientation sensor 238 in FIG. 2. Prior to image processing, a first-pass estimate for the pose associated with mobile device 630 may be obtained by utilizing GPS location information and orientation information generated on mobile device 630. Mobile device 630 may also obtain location and orientation information by detecting, tracking, and triangulating the position of physical tags (e.g., reflective markers) or emitters (e.g., LEDs) attached to one or more other mobile devices using marker-based motion capture technologies. The location and/or orientation information associated with mobile device 630 may be used to improve the accuracy of the localization step.

In one embodiment, localization of mobile device 630 includes searching for image descriptors associated with landmarks or other objects within a field of view of mobile device 630. The extracted image descriptors may subsequently be matched with image descriptors associated with the most recent map of the particular environment acquired from mapping server 620 in step 623. Landmarks may be associated with image features that are easily observed and distinguished from other features within the field of view. Stationary landmarks may act as anchor points or reference points in a 3-D map of a real-world environment. Other points of interest within a real-world environment (e.g., geographical elements such as land features) may also be used for both mapping and localization purposes. Landmarks and other points of interest within the real-world environment may be detected using various image processing methods such as object recognition, frame alignment, feature detection, corner detection, blob detection, and edge detection methods. As mobile device 630 moves around within an environment, mobile device 630 may continuously search for and extract landmarks and associate newly discovered landmarks to those found previously.

For each object within an environment, there may be one or more image descriptors associated with the object that can be extracted and used to identify the object. An image descriptor may comprise image information related to a portion of an object or to the entire object. In one example, an image descriptor may describe characteristics of the object such as its location, color, texture, shape, and/or its relationship to other objects or landmarks within the environment. Utilizing image processing techniques such as object and pattern matching, the one or more image descriptors may be used to locate an object in an image containing other objects. It is desirable that the image processing techniques for detecting and matching the one or more image descriptors be robust to changes in image scale, noise, illumination, local geometric distortion, and image orientation.

In some embodiments, localization of mobile device 630 may be performed in the cloud (e.g., by the mapping server 620). For example, the mobile device 630 may transmit client images 640 derived from sensors associated with mobile device 630 and/or image descriptors 644 extracted in step 632 to the mapping server 620. The mapping server 620 may perform the mobile device localization based on the received client images 640 and/or image descriptors 644 utilizing process steps similar to those performed by mobile device 630 in step 634. Subsequently, mobile device 630 may acquire a pose associated with a field of view of mobile device 630 from the mapping server 620 without needing to acquire the particular map in step 633 or perform localization step 634 (i.e., steps 633 and 634 may be omitted if localization of the mobile device is performed by the mapping server).

More information regarding performing pose estimation and/or localization for a mobile device can be found in U.S. patent application Ser. No. 13/017,474, "Mobile Camera Localization Using Depth Maps," incorporated herein by reference in its entirety.

More information regarding differentiating objects within an environment can be found in U.S. patent application Ser. No. 13/017,626, "Moving Object Segmentation Using Depth Images," incorporated herein by reference in its entirety.

Referring to FIG. 5, in step 635, one or more virtual objects are displayed on mobile device 630. The one or more virtual objects may be rendered on mobile device 630 using a processing element, such as processing unit 236 in FIG. 2. Rendering may involve the use of ray tracing techniques (e.g., simulating the propagation of light and sound waves through a model of the AR environment) in order to generate virtual images and/or sounds from the perspective of a mobile device. Virtual data associated with the one or more virtual objects may be generated by either the mapping server 620 and/or mobile device 630.

In one embodiment, the one or more virtual objects are rendered locally on mobile device 630. In another embodiment, the one or more virtual objects are rendered on mapping server 620 and virtual images corresponding with the determined pose in step 634 may be transmitted to mobile device 630. Virtual images associated with the one or more virtual objects may be displayed on mobile device 630 such that the one or more virtual objects are perceived to exist within a field of view associated with the previously determined pose of step 634. The virtual data associated with the one or more virtual object may also include virtual sounds. In some embodiments, mobile device 630 may request a dense 3-D map of a particular environment in order to realistically render virtual objects and to handle collisions and occlusions due to the interaction of real objects and virtual objects within the particular environment. Virtual sounds may also be registered in relation to the dense 3-D map. The dense 3-D map may be acquired from mapping server 620 and included within mapping data 642.

More information regarding AR systems and environments can be found in U.S. patent application Ser. No. 12/912,937, "Low-Latency Fusing of Virtual and Real Content," incorporated herein by reference in its entirety.

More information regarding generating virtual sounds in an AR environment can be found in U.S. patent application Ser. No. 12/903,610, "System and Method for High-Precision 3-Dimensional Audio for Augmented Reality," incorporated herein by reference in its entirety.

Figure 6A:
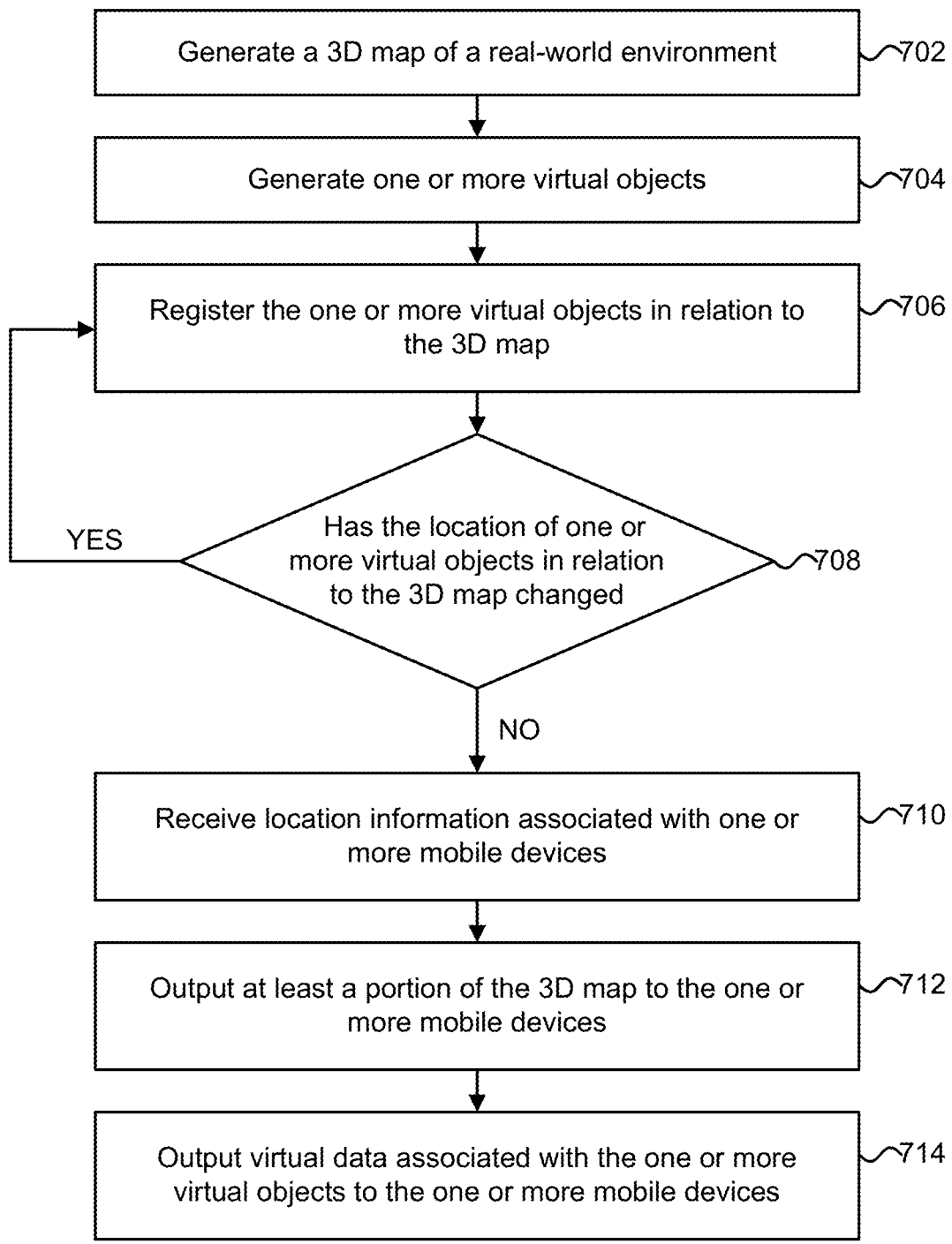
FIG. 6A is a flowchart describing one embodiment of a process for generating a 3-D map of a real-world environment and locating virtual objects within the 3-D map.

FIG. 6A is a flowchart describing one embodiment of a process for generating a 3-D map of a real-world environment and locating virtual objects within the 3-D map. The process of FIG. 6A may be performed continuously and by one or more computing devices. Each step in the process of FIG. 6A may be performed by the same or different computing devices as those used in other steps, and each step need not necessarily be performed by a single computing device. In one embodiment, the process of FIG. 6A is performed by a mapping server such as mapping server 620 in FIG. 5.

In step 702, a 3-D map of a real-world environment is generated. In step 704, one or more virtual objects may be computer generated. In one example, the 3-D map and the one or more virtual objects are generated using a mapping server. The one or more virtual objects may be stored in a database on the mapping server. In step 706, the one or more virtual objects may be registered in relation to the 3-D map. If registration is performed by the mapping server, then the mapping server may control the location of the virtual objects being displayed by one or more mobile devices.

In step 708, a determination is made as to whether or not the location of one or more virtual objects in relation to the 3-D map has changed. The change in location may be due to a perceived interaction between one or more virtual objects and/or one or more real objects, or due to the natural movement of a virtual object through an environment (e.g., via physics simulation). If the location of one or more virtual objects has changed, then the one or more virtual objects are reregistered in relation to the 3-D map in step 706. If the one or more virtual objects are all characterized as static then step 708 may be omitted.

In step 710, location information associated with one or more mobile devices is received. The received location information may be used by a mapping server to customize a particular map associated with the location information. In step 712, at least a portion of the 3-D map is outputted to the one or more mobile devices. The 3-D map may include a customized map of an environment associated with the location information received in step 710. The 3-D map may include one or more image descriptors. The one or more image descriptors may include RGB image descriptors and/or 3-D image descriptors. In one embodiment, a mapping server outputs one of more image descriptors in response to a request from a mobile device for either RGB image descriptors or 3-D image descriptors depending on the requirements of a particular application running on the mobile device. In step 714, virtual data associated with the one or more virtual objects is outputted to the one or more mobile devices.

Figure 6B:
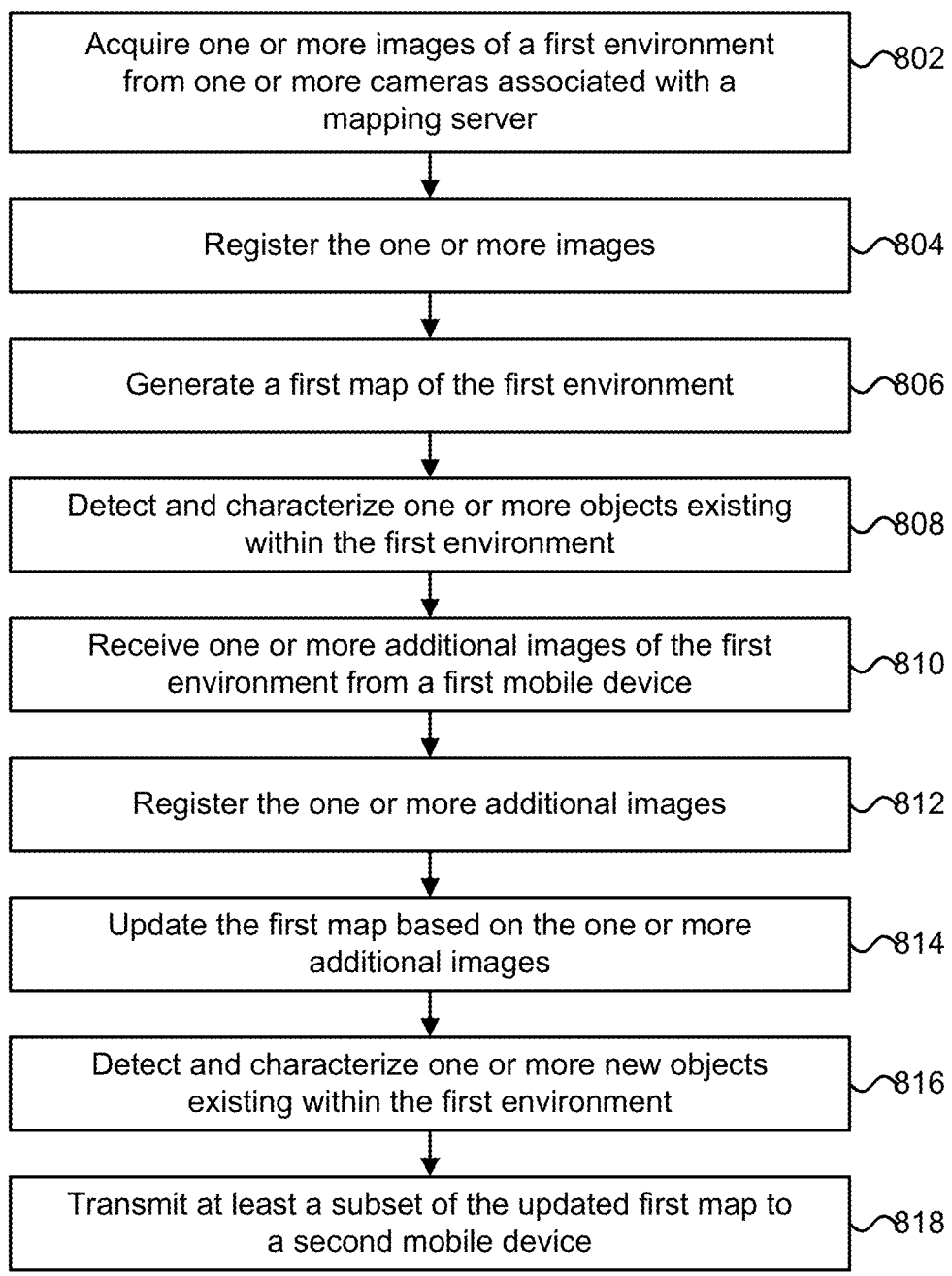
FIG. 6B is a flowchart describing one embodiment of a process for updating a 3-D map of a real-world environment.

FIG. 6B is a flowchart describing one embodiment of a process for updating a 3-D map of a real-world environment. The process of FIG. 6B may be performed continuously and by one or more computing devices. Each step in the process of FIG. 6B may be performed by the same or different computing devices as those used in other steps, and each step need not necessarily be performed by a single computing device. In one embodiment, the process of FIG. 6B is performed by a mapping server such as mapping server 620 in FIG. 5.

In step 802, one or more images of a first environment is acquired from one or more cameras associated with a mapping server. In step 804, the one or more images are registered. In step 806, a first map of the first environment is generated. In step 808, one or more objects existing within the first environment are detected and characterized. Each of the one or more objects may be characterized as either static, semi-static, or dynamic. An object characterized as static is one which does not move. An object characterized as semi-static is one which does not move often. Semi-static objects may be useful for mapping and/or localization purposes because they may act as static landmarks over a period of time within an environment. Object recognition techniques may be used to identify objects, such as furniture or appliances, that may typically be classified as semi-static objects. In one embodiment, maps of an environment are stored and time stamped (e.g., every 2 hours) in order to detect movement of landmarks and to possibly recharacterize one or more objects. In some embodiments, mapping and localization are performed using only objects classified as static objects, thereby discarding any objects characterized as either semi-static or dynamic (i.e., not taking into consideration any moving objects).

In step 810, one or more additional images of the first environment are received from a first mobile device. Localization information associated with the one or more additional images may also be received from the first mobile device. Obtaining pose information along with one or more additional images allows a mapping server to generate one or more maps associated with an environment beyond that capable of being sensed by dedicated mapping server sensors. The one or more additional images may also include depth information. In step 812, the one or more additional images are registered. In some embodiments, the one or more additional images are registered by a mapping server. A mapping server may also accept information from one or more mobile devices in the form of registered RGB data and/or depth reconstructions. In step 814, the first map is updated based on the one or more additional images. In step 816, one or more new objects existing within the first environment are detected and characterized. In step 818, at least a subset of the updated first map is transmitted to a second mobile device. In one embodiment, a first set of mobile devices may be used to update the first map, while a second set of mobile devices perform localization in relation to the updated first map.

Figure 7:
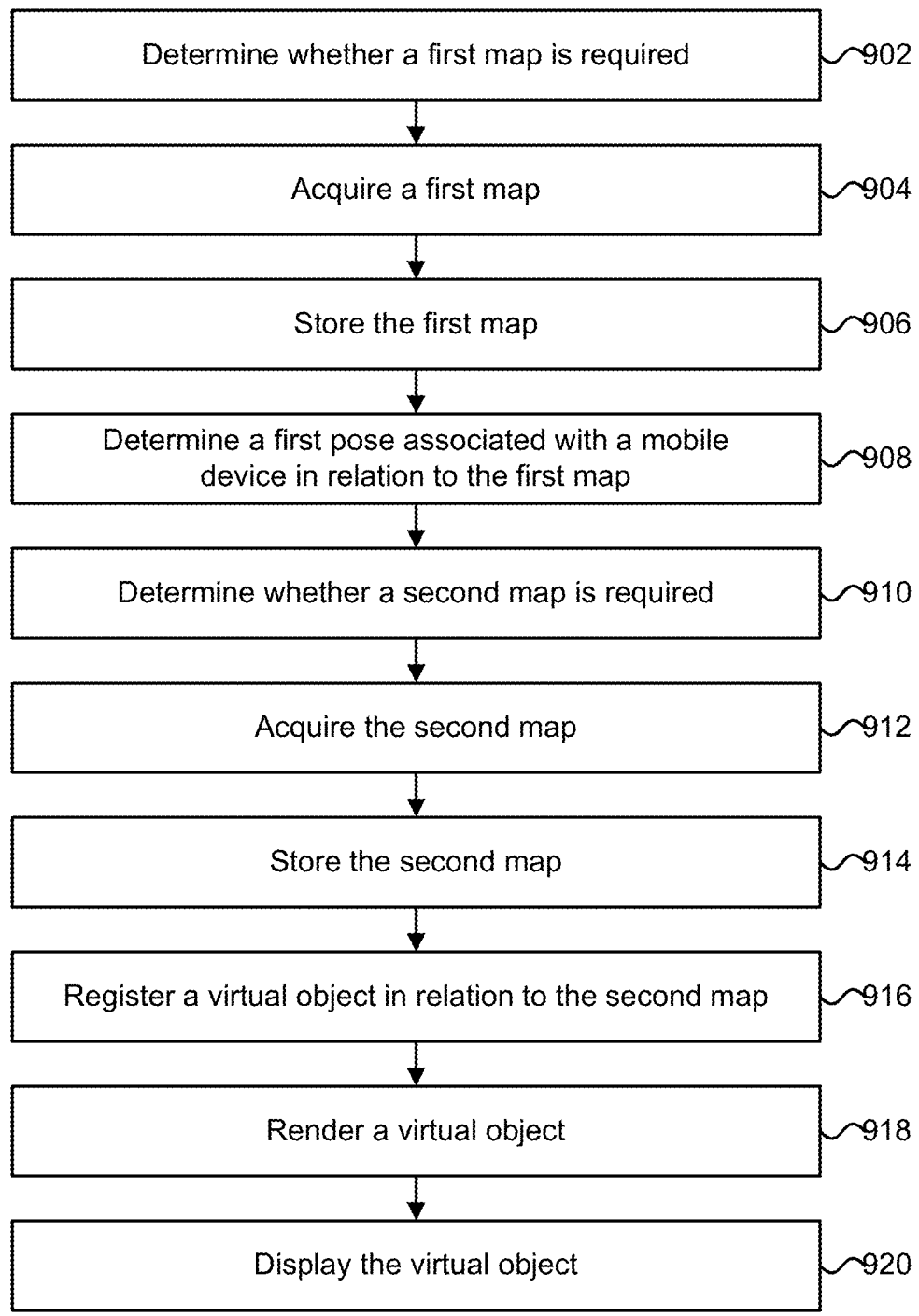
FIG. 7 is a flowchart describing one embodiment of a process for rendering and displaying virtual objects.

FIG. 7 is a flowchart describing one embodiment of a process for rendering and displaying virtual objects. The process of FIG. 7 may be performed continuously and by one or more computing devices. Each step in the process of FIG. 7 may be performed by the same or different computing devices as those used in other steps, and each step need not necessarily be performed by a single computing device. In one embodiment, the process of FIG. 7 is performed by a mobile device such as mobile device 630 in FIG. 5.

In step 902, it is determined whether a first map is required. In one example, a mobile device may determine whether a first map is required for localization purposes by determining a location of the mobile device (e.g., by acquiring a GPS location) and comparing the location with the locations associated with one or more maps stored on the mobile device. A first map may be required if none of the one or more maps stored on the mobile device provide adequate coverage of a particular environment or no map is deemed to be a valid map of the environment encompassing the location. A particular map stored on a mobile device may be deemed invalid because the map has not been refreshed within a certain period of time or an expiration date associated with the particular map has passed. In one example, a particular map stored on a mobile device may be invalidated by a mapping server upon an update to the particular map made by the mapping server.

In step 904, the first map is acquired. The first map may be acquired from a mapping server. In one embodiment, a mobile device may transmit a request for the first map to a mapping server. In another embodiment, a mobile device may transmit a request for the first map to a second mobile device located within a particular environment. In this case, the second mobile device may act as a local mapping cache for the mobile device. The first map may include one or more image descriptors associated with one or more real objects within a particular environment. In step 906, the first map is stored. The first map may be stored in a non-volatile memory within a mobile device.

In step 908, a first pose associated with the mobile device in relation to the first map is determined. The pose estimation or determination may be performed on a mobile device or on a mapping server. In one embodiment, localization is performed on a mobile device using the process of step 634 in FIG. 5. When performing localization on the mobile device, image descriptors associated with non-static objects may be discarded. In another embodiment, a mobile device may transmit images of its environment to a mapping server and the mapping server may perform the localization process on behalf of the mobile device.

In step 910, it is determined whether a second map is required. In one example, a mobile device may determine whether a second map is required for rendering and/or display purposes by determining whether a virtual object is located within (or near) a field of view associated with the first pose determined in step 908. The second map may comprise a higher resolution map of a portion of the first map. In step 912, the second map is acquired. In step 914, the second map is stored. In step 916, a virtual object is registered in relation to the second map. In one example, a mobile device registers the virtual object in relation to the second map prior to rendering the virtual object.

In step 918, the virtual object is rendered. The rendering step may include receiving virtual data associated with the virtual object from a mapping server and generating one or more virtual images of the virtual object based on the virtual data. In step 920, the virtual object is displayed. The virtual object may be displayed by displaying on a mobile device one or more virtual images associated with the virtual object. The one or more virtual images may correspond with a view of the virtual object such that the virtual object is perceived to exist within the field of view associated with the first pose determined in step 908.

Figure 8:
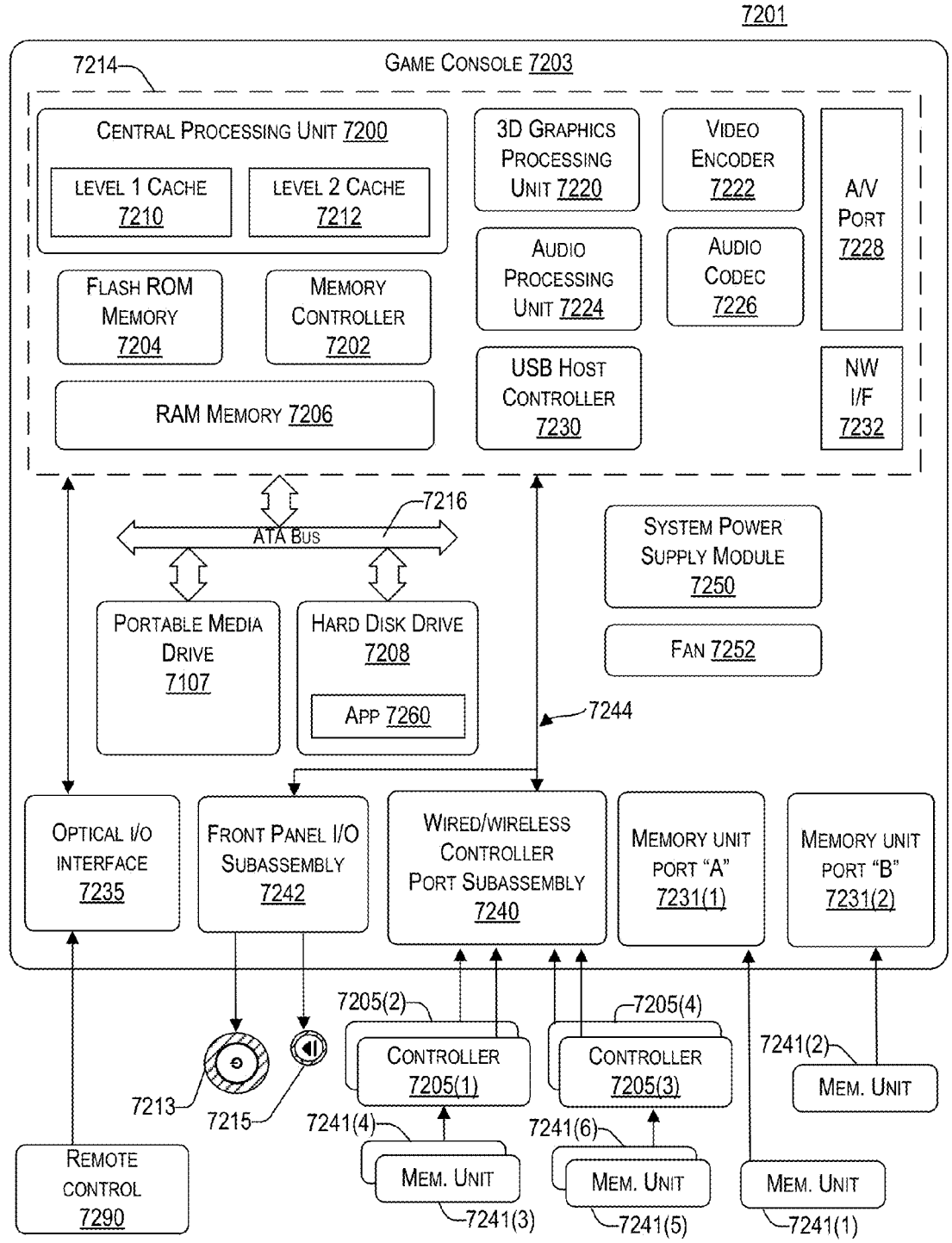
FIG. 8 is a block diagram of an embodiment of a gaming and media system.
Figure 9:
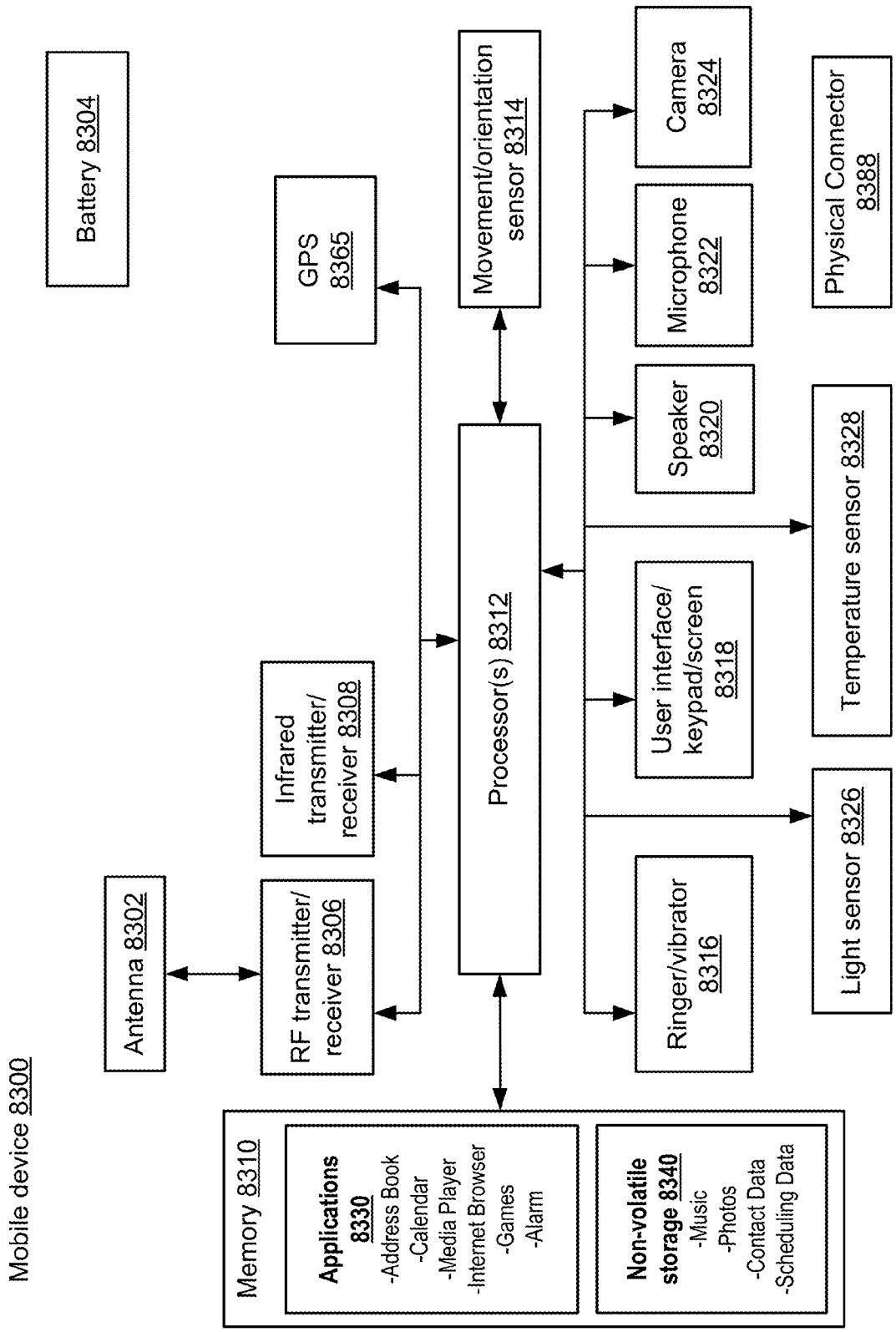
FIG. 9 is a block diagram of one embodiment of a mobile device.
Figure 10:
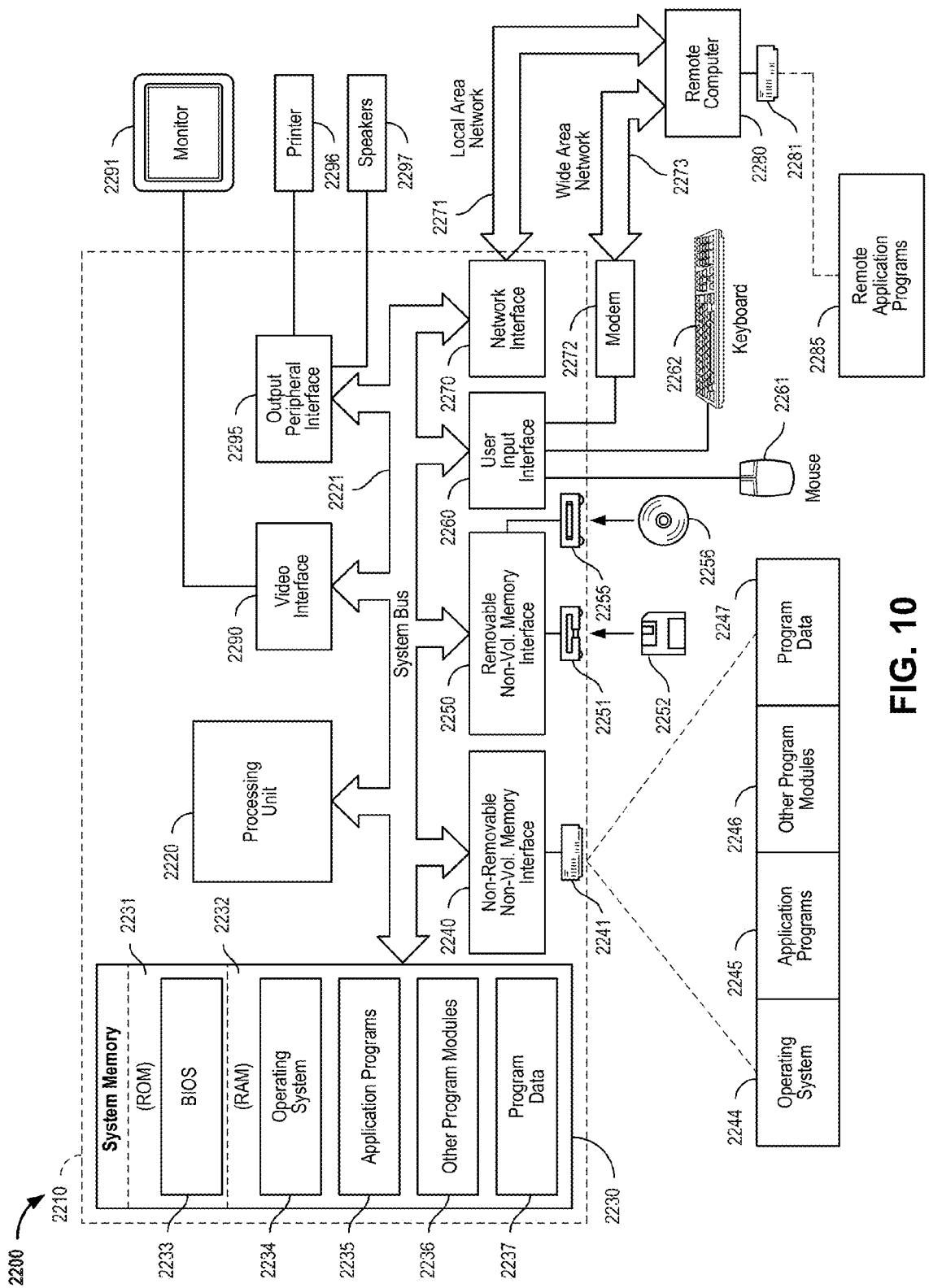
FIG. 10 is a block diagram of an embodiment of a computing system environment.

The disclosed technology may be used with various computing systems. FIGS. 8-10 provide examples of various computing systems that can be used to implement embodiments of the disclosed technology.

FIG. 8 is a block diagram of an embodiment of a gaming and media system 7201. Console 7203 has a central processing unit (CPU) 7200, and a memory controller 7202 that facilitates processor access to various types of memory, including a flash Read Only Memory (ROM) 7204, a Random Access Memory (RAM) 7206, a hard disk drive 7208, and portable media drive 7107. In one implementation, CPU 7200 includes a level 1 cache 7210 and a level 2 cache 7212, to temporarily store data and hence reduce the number of memory access cycles made to the hard drive 7208, thereby improving processing speed and throughput.

CPU 7200, memory controller 7202, and various memory devices are interconnected via one or more buses (not shown). The one or more buses might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus.

In one implementation, CPU 7200, memory controller 7202, ROM 7204, and RAM 7206 are integrated onto a common module 7214. In this implementation, ROM 7204 is configured as a flash ROM that is connected to memory controller 7202 via a PCI bus and a ROM bus (neither of which are shown). RAM 7206 is configured as multiple Double Data Rate Synchronous Dynamic RAM (DDR SDRAM) modules that are independently controlled by memory controller 7202 via separate buses (not shown). Hard disk drive 7208 and portable media drive 7107 are shown connected to the memory controller 7202 via the PCI bus and an AT Attachment (ATA) bus 7216. However, in other implementations, dedicated data bus structures of different types may also be applied in the alternative.

A three-dimensional graphics processing unit 7220 and a video encoder 7222 form a video processing pipeline for high speed and high resolution (e.g., High Definition) graphics processing. Data are carried from graphics processing unit 7220 to video encoder 7222 via a digital video bus (not shown). An audio processing unit 7224 and an audio codec (coder/decoder) 7226 form a corresponding audio processing pipeline for multi-channel audio processing of various digital audio formats. Audio data are carried between audio processing unit 7224 and audio codec 7226 via a communication link (not shown). The video and audio processing pipelines output data to an NV (audio/video) port 7228 for transmission to a television or other display. In the illustrated implementation, video and audio processing components 7220-7228 are mounted on module 7214.

FIG. 8 shows module 7214 including a USB host controller 7230 and a network interface 7232. USB host controller 7230 is in communication with CPU 7200 and memory controller 7202 via a bus (not shown) and serves as host for peripheral controllers 7205(1)-7205(4). Network interface 7232 provides access to a network (e.g., Internet, home network, etc.) and may be any of a wide variety of various wire or wireless interface components including an Ethernet card, a modem, a wireless access card, a Bluetooth® module, a cable modem, and the like.

In the implementation depicted in FIG. 8, console 7203 includes a controller support subassembly 7240 for supporting four controllers 7205(1)-7205(4). The controller support subassembly 7240 includes any hardware and software components needed to support wired and wireless operation with an external control device, such as for example, a media and game controller. A front panel I/O subassembly 7242 supports the multiple functionalities of power button 7213, the eject button 7215, as well as any LEDs (light emitting diodes) or other indicators exposed on the outer surface of console 7203. Subassemblies 7240 and 7242 are in communication with module 7214 via one or more cable assemblies 7244. In other implementations, console 7203 can include additional controller subassemblies. The illustrated implementation also shows an optical I/O interface 7235 that is configured to send and receive signals (e.g., from remote control 7290) that can be communicated to module 7214.

MUs 7241(1) and 7241(2) are illustrated as being connectable to MU ports "A" 7231(1) and "B" 7231(2) respectively. Additional MUs (e.g., MUs 7241(3)-7241(6)) are illustrated as being connectable to controllers 7205(1) and 7205(3), i.e., two MUs for each controller. Controllers 7205(2) and 7205(4) can also be configured to receive MUs (not shown). Each MU 7241 offers additional storage on which games, game parameters, and other data may be stored. Additional memory devices, such as portable USB devices, can be used in place of the MUs. In some implementations, the other data can include any of a digital game component, an executable gaming application, an instruction set for expanding a gaming application, and a media file. When inserted into console 7203 or a controller, MU 7241 can be accessed by memory controller 7202. A system power supply module 7250 provides power to the components of gaming system 7201. A fan 7252 cools the circuitry within console 7203.

An application 7260 comprising machine instructions is stored on hard disk drive 7208. When console 7203 is powered on, various portions of application 7260 are loaded into RAM 7206, and/or caches 7210 and 7212, for execution on CPU 7200. Other applications may also be stored on hard disk drive 7208 for execution on CPU 7200.

Gaming and media system 7201 may be operated as a standalone system by simply connecting the system to a monitor, a television, a video projector, or other display device. In this standalone mode, gaming and media system 7201 enables one or more players to play games or enjoy digital media (e.g., by watching movies or listening to music). However, with the integration of broadband connectivity made available through network interface 7232, gaming and media system 7201 may further be operated as a participant in a larger network gaming community.

FIG. 9 is a block diagram of one embodiment of a mobile device 8300. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

FIG. 10 is a block diagram of an embodiment of a computing system environment 2200. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 10 illustrates operating system 2234, application programs 2235, other program modules 2236, and program data 2237.

The computer 2210 may also include other removable/non-removable, volatile/nonvolatile computer storage media. By way of example only, FIG. 10 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 10, provide storage of computer readable instructions, data structures, program modules and other data for the computer 2210. In FIG. 10, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 10. The logical connections depicted in FIG. 10 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 10 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for providing an augmented reality environment on a mobile device, comprising:
   determining whether a localization map is required, the determining whether a localization map is required is performed on the mobile device and includes acquiring a first location associated with the mobile device, the localization map is associated with a first environment;
   acquiring the localization map, the localization map includes one or more image descriptors, the one or more image descriptors are associated with one or more real objects within the first environment, the acquiring the localization map includes acquiring the localization map from a mapping server, the mapping server generates the localization map based on image information received from one or more server sensors decoupled from the mobile device, the one or more server sensors move about the first environment independently of the mobile device, the localization map includes a sparse 3-D map of the first environment;
   storing the localization map on the mobile device;
   determining a first pose associated with the mobile device, the determining a first pose is performed on the mobile device and includes receiving one or more images, the one or more images comprise a field of view associated with the first pose, the determining a first pose includes detecting at least one of the one or more image descriptors within the one or more images;
   determining whether a rendering map is required, the determining whether a rendering map is required includes determining whether a virtual object is located within the field of view associated with the first pose, the rendering map is associated with at least a portion of the first environment, the rendering map has a higher resolution than the localization map;
   acquiring the rendering map;
   storing the rendering map on the mobile device, the rendering map includes a dense 3-D map of the first environment, the mobile device includes a head mounted display device;
   rendering the virtual object, the rendering includes registering the virtual object in relation to the rendering map; and
   displaying on the mobile device a virtual image associated with the virtual object, the virtual image corresponds with a view of the virtual object such that the virtual object is perceived to exist within the field of view associated with the first pose.

2. The method of claim 1, wherein:
   the rendering is performed on the mobile device, the rendering includes receiving virtual data associated with the virtual object from the mapping server, the rendering includes generating the virtual image of the virtual object based on the virtual data, the rendering includes generating virtual sounds associated with the virtual object.

3. The method of claim 1, wherein:
   the determining a first pose includes determining a first position and a first orientation of the mobile device in relation to the localization map, the determining a first pose includes discarding each of the one or more image descriptors that are associated with semi-static objects.

4. The method of claim 1, wherein:
   the acquiring the localization map includes transmitting a request for the localization map to the mapping server.

5. The method of claim 1, wherein:
   the acquiring the localization map includes transmitting a request for the localization map to a second mobile device, the second mobile device is located within the first environment.

6. The method of claim 1, wherein:
   the determining whether a virtual object is within the field of view associated with the first pose is performed on the mobile device.

7. The method of claim 1, wherein:
   the one or more server sensors are associated with an autonomous vehicle.

8. An electronic device for providing an augmented reality environment, comprising:
   one or more processors, the one or more processors request a localization map from a mapping server, the mapping server generates the localization map based on image information received from one or more server sensors decoupled from the electronic device, the one or more server sensors move about a first environment independently of the electronic device;
   a network interface, the network interface receives the localization map, the localization map includes one or more image descriptors, the one or more image descriptors are associated with one or more real objects within the first environment, the one or more processors determine a first pose associated with a field of view of the electronic device, the network interface receives virtual data associated with the virtual object, the one or more processors determine whether a rendering map is required based on the location of the virtual object within the field of view, the network interface receives the rendering map, the rendering map has a higher resolution than the localization map;
   a memory, the memory stores the rendering map, the one or more processors render the virtual object in relation to the rendering map; and
   a display, the display displays a virtual image associated with the virtual object, the virtual image corresponds with a view of the virtual object such that the virtual object is perceived to exist within the field of view.

9. The electronic device of claim 8, wherein:
   the electronic device is a mobile device; and
   the one or more server sensors are associated with an autonomous vehicle.

10. The electronic device of claim 8, wherein:
each of the one or more real objects are characterized as one of static objects or semi-static objects;
the localization map includes a sparse 3-D map of the first environment;
the rendering map includes a dense 3-D map of the first environment; and
the electronic device includes a head mounted display device.

11. The electronic device of claim 8, wherein:
the determination of the first pose includes determining a first position and a first orientation of the electronic device in relation to the localization map.

12. The electronic device of claim 8, wherein:
the network interface receives the localization map from the mapping server.

13. The electronic device of claim 8, wherein:
the network interface receives the localization map from a second electronic device, the second electronic device is a mobile device.

14. One or more storage devices containing processor readable code for programming one or more processors to perform a method comprising the steps of:
determining whether a localization map is required, the determining whether a localization map is required is performed on a mobile device and includes acquiring a first location associated with the mobile device, the localization map is associated with a first environment, the determining whether a localization map is required includes determining whether another map stored on the mobile device is valid and associated with the first environment;
acquiring the localization map from a mapping server, the localization map includes one or more image descriptors, the one or more image descriptors are associated with one or more real objects within the first environment, the mapping server generates the localization map based on image information received from one or more server sensors decoupled from the mobile device, the one or more server sensors move about a first environment independently of the mobile device;
storing the localization map on the mobile device;
determining a first pose associated with the mobile device, the determining a first pose is performed on the mobile device and includes receiving one or more images, the one or more images comprise a field of view associated with the first pose, the determining a first pose includes detecting at least one of the one or more image descriptors within the one or more images;
determining whether a rendering map is required, the determining whether a rendering map is required includes determining whether a virtual object is located within the field of view associated with the first pose, the determining whether a virtual object is within the field of view associated with the first pose is performed on the mobile device, the rendering map is associated with at least a portion of the first environment, the rendering map has a higher resolution than the localization map;
acquiring the rendering map;
storing the rendering map on the mobile device;
rendering the virtual object, the rendering includes registering the virtual object in relation to the rendering map; and
playing on the mobile device a virtual sound associated with the virtual object, the virtual sound is perceived to originate from a location associated with the virtual object.

15. The one or more storage devices of claim 14, wherein:
the rendering is performed on the mobile device, the rendering includes receiving virtual data associated with the virtual object from the mapping server; and
the one or more server sensors are associated with an autonomous vehicle.

16. The one or more storage devices of claim 15, wherein:
the acquiring a first location includes acquiring the first location from a GPS receiver associated with the mobile device;
the localization map includes a sparse 3-D map of the first environment;
the rendering map includes a dense 3-D map of the first environment; and
the mobile device includes a head mounted display device.

17. The one or more storage devices of claim 15, wherein:
the determining a first pose includes determining a first position and a first orientation of the mobile device in relation to the localization map, the determining a first pose includes discarding each of the one or more image descriptors that are characterized as non-static objects.

18. The one or more storage devices of claim 17, wherein:
the acquiring the localization map includes transmitting a request for the localization map to the mapping server.

19. The one or more storage devices of claim 17, wherein:
the acquiring the localization map includes transmitting a request for the localization map to a second mobile device, the second mobile device is located within the first environment.

* * * * *